May 8, 1951  E. L. NOTESTEIN  2,551,897
POST DRIVING APPARATUS
Filed Oct. 22, 1947  2 Sheets-Sheet 1
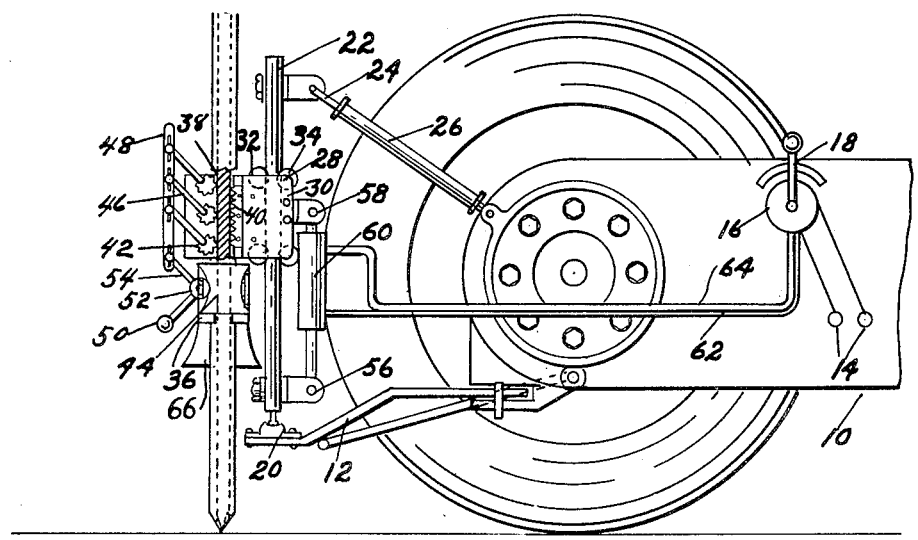
FIG. 1.
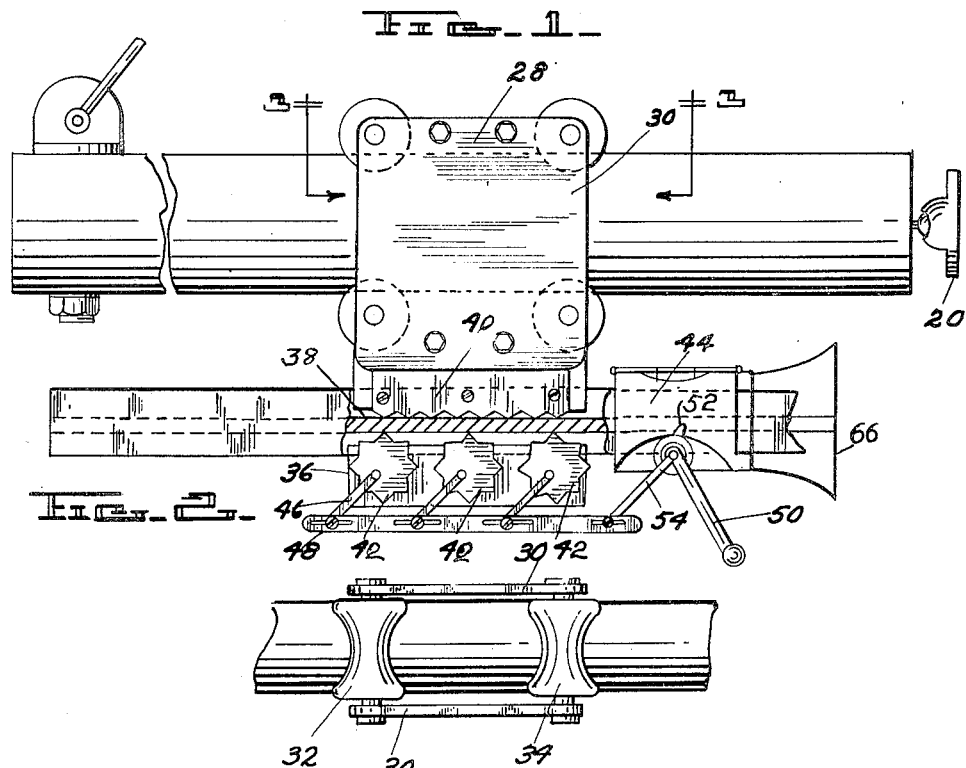
FIG. 2.
FIG. 3.
INVENTOR
EDISON L. NOTESTEIN
BY
*C. H. Fowler*
ATTORNEY May 8, 1951 E. L. NOTESTEIN 2,551,897
POST DRIVING APPARATUS
Filed Oct. 22, 1947 2 Sheets-Sheet 2
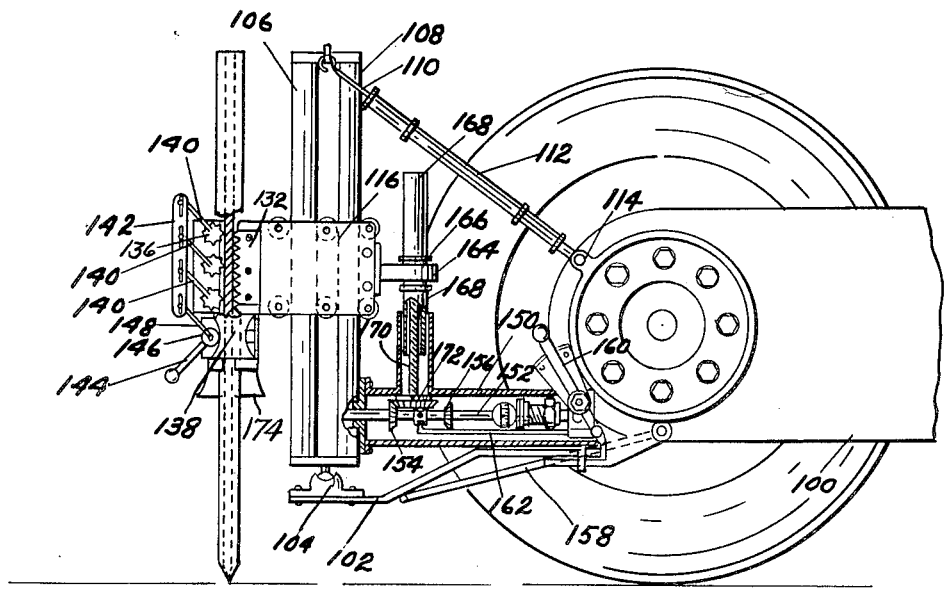
FIG_4_
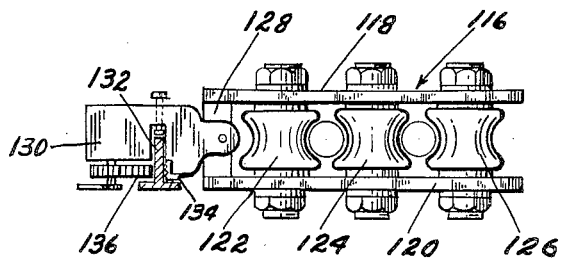
FIG_5_
INVENTOR
EDISON L. NOTESTEIN
BY
ATTORNEY Patented May 8, 1951

2,551,897

UNITED STATES PATENT OFFICE 2,551,897

POST DRIVING APPARATUS

Edison Lowell Notestein, Wayne, Mich.

Application October 22, 1947, Serial No. 781,387

4 Claims. (Cl. 254—29)

This invention relates to post driving apparatus and more particularly to that type adapted to be operated by the power take-off of a tractor.

The invention comprehends a post driving apparatus adapted to be mounted on the hitch of a conventional tractor and connected to the power take-off thereof. More specifically the invention contemplates a column pivotally supported on the hitch of a tractor and connected to the tractor by adjustable tie rods, a head reciprocable on the column, a clutch carried on the head for the reception of a post, and driving connections between the head and the power take-off.

An object of the invention is to provide a post driving apparatus including a reciprocable head, a clutch carried thereby and means for applying power to the head.

Another object of the invention is to provide an efficient post driving apparatus including a reciprocable head, a clutch pivotally supported on the head and means for applying power to the head for movement thereof in two directions.

Other objects and advantages of the invention will appear from the following description when taken in connection with the drawings forming a part of this specification, and in which:

Fig. 1 is a side elevation of a tractor partly broken away illustrating the invention as applied.

Fig. 2 is an enlarged view of the post driving apparatus.

Fig. 3 is a detail view illustrating the mounting of the head.

Fig. 4 is a side elevation of a tractor partly broken away illustrating a modification of the post driving apparatus as applied, and Fig. 5 is a detail view illustrating the mounting of the driving head.

Referring to the drawings for more specific details of the invention 10 represents a tractor having a conventional hitch 12, and a hydraulic power take-off 14 controlled as by a valve 16 operated by a hand lever 18.

A universal joint 20 suitably secured on the hitch 12 supports a column 22 and oppositely disposed tie rods 24 each having coupled therein turn buckles 26 which connect the top of the column 22 to flanges on the axle of the tractor. By adjusting the turn buckles 26, the column 22 may be inclined at any angle with relation to the tractor and to the ground to compensate for variations in the surface of the ground in which posts are to be driven.

A driving head 28 mounted for travel on the column 22 includes spaced plates 30 having mounted for rotation therebetween two sets of spaced rollers 32 and 34. The rollers are so spaced both as to sets and as to individual rollers that they embrace the column 22 and roll freely thereon.

A casting 36 suitably secured between the plates 30 has a slot 38 for the reception of a post and adjustably supported in the bottom of the slot is a bearing bar for varying the depth of the slot so as to compensate for posts of different widths.

A rack 40 is suitably mounted on the casting 36 on one side of the slot 38 and cams 42 having serrated faces also mounted on the casting 36 in spaced relation to one another and in oppositely disposed relation to the rack 40, and a door 44 hinged on the casting is adapted to close over the slot.

The cams 42 have arms 46 pivotally connected to a rod 48. A hand lever 50 controls a latch 52 which cooperates with the edge of the door, for locking the door 44 and a rod 54 is pivotally connected to the latch 52 and to the rod 48. By throwing the lever 50 the cams 42 may be moved to grip the post and simultaneously with this action the latch 52 is actuated to lock the door over the post.

A bracket 56 is suitably secured on the column 22 and a similar bracket 58 is fixedly secured to the driving head 28, and connected between the brackets is a fluid actuated unit 60 connected as by conduits 62 and 64 to the valve 16.

A shoe or ram 66 depends from the casting 36. The ram is adapted to engage or strike the earth just prior to the end of the stroke required to drive the post into the ground the desired depth so as to effectively pack the ground around the post.

In operation the column 22 is adjusted in proper relation to the ground in which the post is to be set by manipulation of the turn buckles 24. A post is then inserted in the slot in the driving head 28 and the door 44 closed over the post. The lever 50 is then thrown to move the latch 52 so as to lock the door and simultaneously therewith the cams 40 are rotated to grip the post.

When in this position the lever 18 is thrown to admit fluid under pressure to the conduit 64 and to release pressure on the fluid in the conduit 62 and the fluid entering the conduit 64 flows therethrough into the fluid actuated unit 60, causing contraction of the fluid pressure actuated unit 60, resulting in drawing the head downwardly and forcing the post gripped in the head into the ground, and at the end of the stroke of the fluid actuated unit 60, the ram 66 strikes the earth with sufficient force to effectively pack the earth around the plot. The lever 50 is then thrown to unlatch the door 44 and disengage the posts, whereupon the head may be swung to free the post.

Where it is desired to remove a post, the head 28 is adjusted to the post as in a driving operation, except that the cams 40 are reversed by throwing the lever 50 over. When in this position the lever 18 is manipulated to admit fluid under pressure to the conduit 62 and release pressure on the fluid in the conduit 64 and the fluid flowing under pressure through the conduit 62 into the fluid pressure unit 60 causes expansion thereof, resulting in moving the head 28 upwardly and thereby extracting the post from the ground.

A modification of the invention is illustrated in Figs. 4 and 5. In this modification, a tractor 100 has a conventional hitch 102, and a universal joint 104 suitably secured thereon supports spaced columns 106 and 108 connected as by brace rods 110, each having coupled therein a turn buckle 112, to flanges 114 on the rear axle of the tractor.

A driving head 116 is mounted for travel on the columns 106 and 108. As shown, the heads include spaced plates 118 and 120 having mounted therebetween three sets of rollers 122, 124 and 126. The rollers are spaced with respect to sets and with respect to one another and embrace the columns 106 and 108. This structure is very desirable, for it provides a very rigid support for the head.

A spacer 128 is suitably secured between the plates 118 and 120 and a casting 130 is pivotally supported on the spacer. The casting has a slot 132 for the reception of a post and a rack 134 at one side of the slot cooperates with spaced cams 136 on the other side of the slot for gripping the post, and a door 138 hinged on the casting is adapted to close over the slot so as to hold the post against displacement.

The cams 136 have arms 140 connected as by a rod 142, and a lever 144 controls a latch 146 for the door 138, and a rod 148 is pivotally connected to the latch and to the rod 142. Upon throwing the lever 144 the cams 136 are rotated to grip the post and simultaneously therewith the latch 146 is moved to engage the edge of the door to secure the door 138, so as to retain the post against displacement.

A housing 150 bolted or otherwise secured to the column 108 has supported therein for reciprocation a shaft 152 having thereon spaced pinions 154 and 156 arranged in oppositely disposed relation to one another. The shaft is suitably connected to the power take-off of the tractor and connected between the shaft and the take-off is a trip 158 operative to disconnect the shaft when subjected to excess loads. A shift lever 160 pivoted on the housing is connected as by a rod 162 to the shaft 152 for engaging or disengaging the pinions 154 and 156.

A bracket 164 suitably secured to the head 116 supports a nut 166 having secured thereto sleeves 168. A screw 170 supported in the sleeves is received by the nut and the screw carries a gear 172 adapted to mesh with the pinions 154 and 156. A shoe or ram 174 depending from the casting 130 is adapted to engage the earth at the end of the stroke of the head so as to pack the earth around the post.

In operation, assuming that a post is locked in the driving head 116, the power supplied from the tractor drives the shaft 152. When it is desired to set the post, the lever 160 is shifted as to engage the pinion 154 with the gear 172. This causes rotation of the screw 170, and the nut 166 on the screw travels downwardly, carrying with it the driving head 116 and the post locked in the head, resulting in driving the post in the ground and at the end of the stroke of the head 116, the ram 174 strikes the ground with sufficient force to pack the earth around the post.

When it is desired to withdraw the post, the operation is reversed by shifting the lever 160 so as to engage the pinion 156 with the gear 172. This results in upward travel of the nut 166 carrying with it the head, and this draws the post from the ground.

While this invention has been described in connection with certain specific embodiments, the principles involved are susceptible of numerous other applications that will readily occur to persons skilled in the art.

Having thus described the various features of the invention what I claim as new and desire to secure by Letters Patent is:

1. A post driving apparatus comprising a fixed support, a column pivotally mounted thereon, means for supporting the column at various angles with relation to the support, a driving head mounted on the column for reciprocable and swingable movements, an enclosure on the head, a clutch carried by the head, a fluid pressure actuated unit connected between the column and the head operative to reciprocate the head on the column and a fluid pressure source connected to the unit.

2. A post driving apparatus comprising a fixed support, a column pivotally mounted thereon, means for bracing the column and varying the angular relation thereof with respect to the support, a head mounted for travel and for slight angular movement on the column, means carried by the head for clutching a post, means for retaining the post in the clutch, and a fluid pressure actuated unit connected between the column and the head operative to reciprocate the head.

3. In combination with a tractor having a hitch and a fluid pressure take-off, a column mounted on the hitch and connected by tie rods to the tractor; a head reciprocable and movable angularly on the column, an enclosure on the head for the reception of a post a clutch carried by the head for gripping the post, a fluid pressure actuated unit connected between the column and head for reciprocating the head and means connecting a fluid pressure unit to the fluid pressure take-off.

4. In combination with a tractor having a hitch and a fluid pressure take-off, a column pivotally supported on the hitch, adjustable tie rods connecting the top of the column to the tractor, a head mounted on the column for reciprocation and slight angular movements, means on the head for reception of a post, means for gripping the post, means for locking the reception means and simultaneously actuating the gripping means, a fluid pressure actuated unit connected between the column and the head for reciprocation of the head and means connecting the fluid pressure unit, to the fluid pressure take-off including a control valve.

EDISON LOWELL NOTESTEIN.

REFERENCES CITED

The following references are of record in the file of this patent:

UNITED STATES PATENTS

| Number | Name | Date |
|---|---|---|
| 177,372 | Canan | May 16, 1876 |
| 2,244,899 | Smith | June 10, 1941 |

FOREIGN PATENTS

| Number | Country | Date |
|---|---|---|
| 370,551 | Germany | Mar. 3, 1923 |